UNITED STATES PATENT OFFICE.

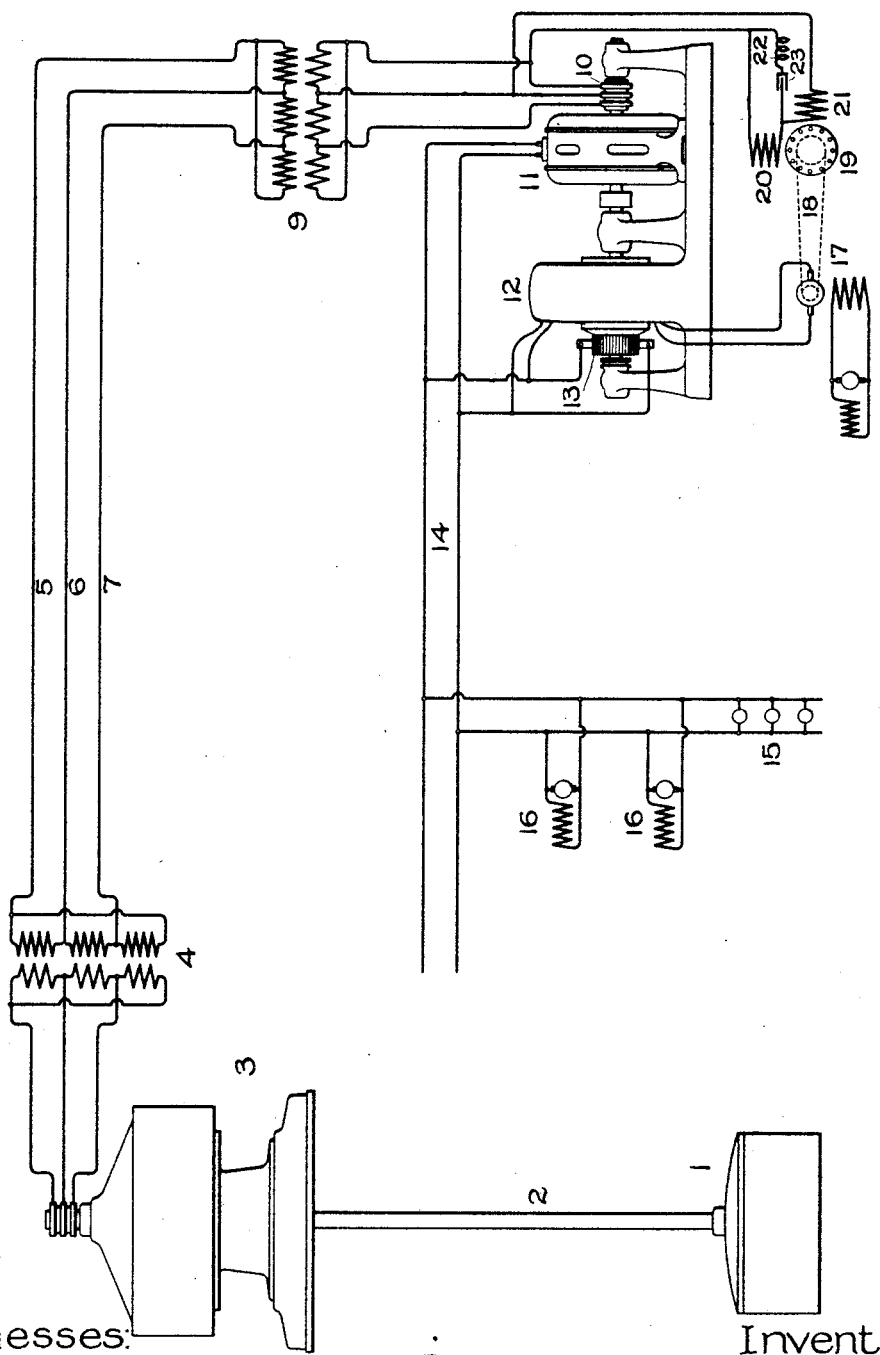

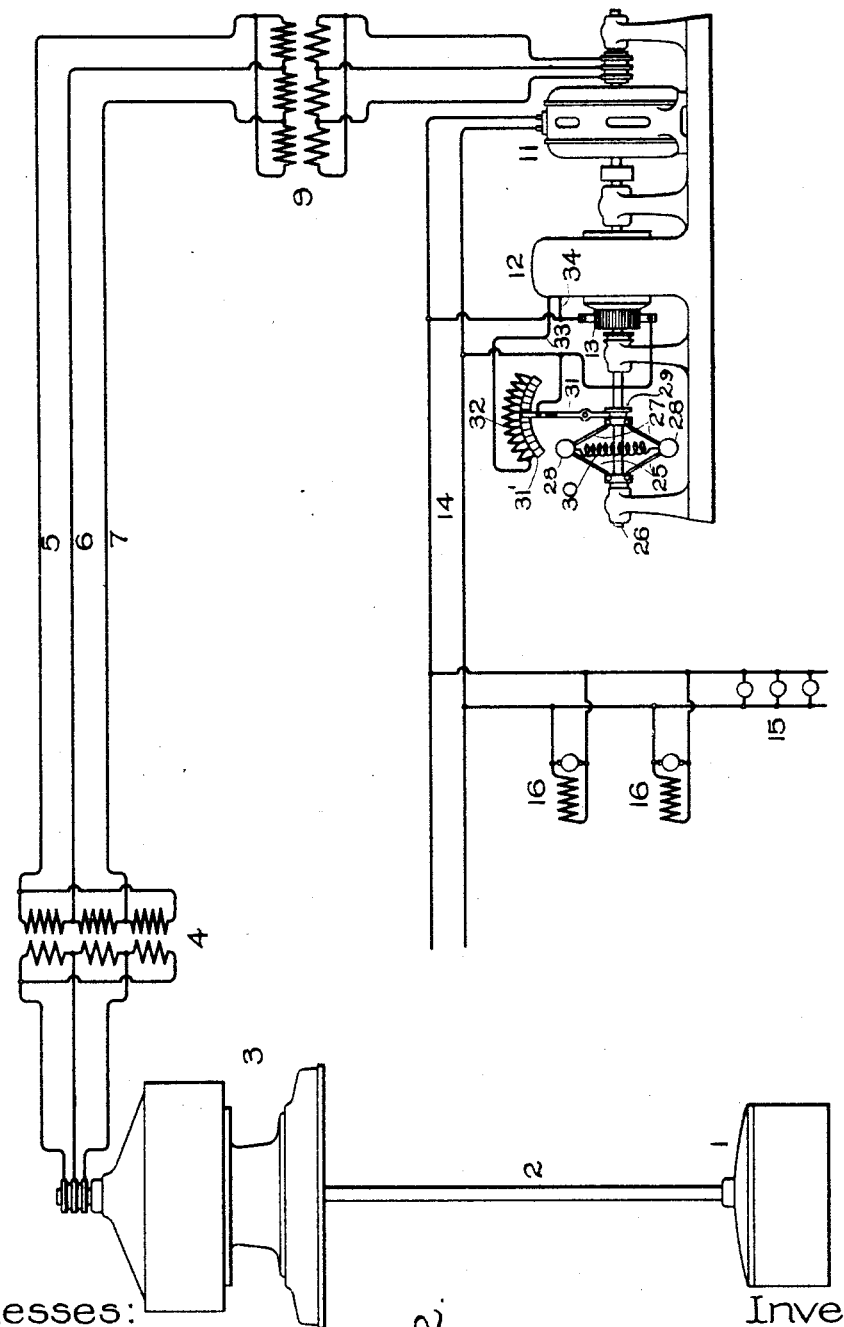

THOMAS WALLEY WILLIAMS, OF SCHENECTADY, NEW YORK, ASSIGNOR TO GENERAL ELECTRIC COMPANY, A CORPORATION OF NEW YORK.

REGULATION OF DYNAMO-ELECTRIC MACHINES.

SPECIFICATION forming part of Letters Patent No. 697,057, dated April 8, 1902.

Application filed December 4, 1900. Serial No. 38,619. (No model.)

*To all whom it may concern:*

Be it known that I, THOMAS WALLEY WILLIAMS, a subject of the Queen of Great Britain, residing at Schenectady, county of Schenectady, State of New York, have invented certain new and useful Improvements in Regulation of Dynamo-Electric Machines, (Case No. 1,628,) of which the following is a specification.

My present invention relates to a system of electrical distribution containing means for regulating the electromotive force of a generator connected therewith, and is of particular value where the driving power of such generator or similar machine is subject to considerable fluctuations in speed, as when driven, for example, by water-power, a gas-engine, or the like. In the accompanying drawings I have shown the invention as applied to the regulation of a motor-generator set which receives its energy through a high-potential alternating-current-transmission system supplied with current from a generator driven by water-power.

The details of the invention will better be understood by reference to the following description, reference being had to the accompanying drawings.

The features of novelty will be pointed out in the appended claims.

Figures 1 and 2 of the drawings show different modifications of my invention.

In Fig. 1 the prime mover is represented at 1 and consists of a water-wheel of any ordinary construction. This water-wheel is connected by a shaft 2 with an alternating-current three-phase generator 3, which supplies current to the primary winding of a step-up transformer 4. The secondary winding of this transformer feeds current of high potential into transmission-lines 5, 6, and 7. The current after traversing the conductors of the transmission-lines 5, 6, and 7 passes into the primary winding of a step-down transformer 9, the secondary of which is connected, through collector-rings and brushes 10, to the rotating member of the synchronous motor 11. This synchronous motor is mounted on the same shaft with a direct-current generator 12 of ordinary construction. The commutator of the generator is shown at 13. Upon this commutator bear brushes, which are connected in the usual way to direct-current mains 14, which supply translating devices of any desired character—such, for instance, as lamps 15 and motors 16. The field of the generator 12 is also excited in the usual manner by windings connected in a circuit across the brushes 13. For the purpose of regulating the magnetizing effect of this winding, and thereby maintaining the voltage of the generator constant regardless of the fluctuations in speed of the prime mover 1, I include in series with this winding a separately-excited auxiliary generator 17, driven by a motive device which revolves in one direction when the frequency of current supplied to the motor-generator set is above the normal and in the other direction when below the normal. This motive device is connected by the belt 18 to the auxiliary generator 17 and consists, as shown, of an induction-motor having an armature 19 and two angularly-displaced field-windings 20 and 21. (Shown in this case in series with each other.) Across one of these windings is shunted a circuit having in series therein an inductance device 22 and a condenser 23, the capacity and inductance of this circuit being such as to exactly neutralize each other when normal frequency exists upon the transmission-lines leading to the motor-generator 11. Under these conditions the current in the two windings 20 and 21 are in phase with each other and no rotation of the movable member 19 is produced. If, however, the frequency varies from the normal, the inductance and capacity no longer balance each other, the effect of one overbalancing that of the other. The current in the coil 20 is consequently displaced in phase from that of the coil 21 and the motive device starts into operation, thereby driving the regulating-generator 17, which produces an electromotive force which when combined with that already acting on the field-circuit of the generator 12 compensates for the change of voltage due to the change of speed of the synchronous-motor 11. The connection of the generator 17 is made so that it adds its electromotive force to that already acting on the field-circuit of the generator 12 when the frequency of the current-supply to the synchronous-motor 11 falls. When the frequency rises above the normal, the motive device 19 reverses in direction, thereby causing the electromotive force of the regulating-generator to act in opposition to cut down the voltage of a generator 12.

Although I have described the voltage of the regulating-generator as acting upon a field-exciting circuit of the generator 12 already supplied with current, it is evident that the said regulating-generator 17 may supply current to separate regulating-coils on the generator. This as well as other and more radical changes may be made without departing from the spirit of my invention.

Fig. 2 shows a somewhat-different embodiment of my invention. The motor-generator set is indicated at 11 and 12, its connections with the prime mover being the same as shown in Fig. 1, the corresponding parts in the two figures being represented by the same numerals. The regulating device in Fig. 2 consists of a centrifugal governor which controls a current-varying means associated with the field of the generator 12. This centrifugal governor consists of two arms 25, pivoted to the shaft 26 of the generator, these arms coöperating with two other arms 27 to carry the governor-balls 28. The arms 27 are pivoted to a sleeve 29, which is arranged so that it may slide along the shaft 26. The rotary motion of the shaft causes the governor-balls to be thrown outward, the spring 30 serving to oppose this tendency and limit the amount of movement. A rheostat-arm 31 is arranged so that one end engages a groove in the sleeve 29, the other end coöperating with a series of contacts 31', joined at regular intervals to a resistance 32. The field-circuit 33 34 of the generator 12 is connected so as to include this resistance-varying device, the terminal 33 of the field-circuit being connected to one end of the resistance 32, the circuit to the main 14 being completed through the rheostat-arm 31, as shown. In case the speed of the generator 12 increases above the normal the centrifugal governor causes the sleeve 29 to move toward the end of the shaft, thereby acting upon the rheostat to cut more or less of the resistance 32 into circuit, thereby preventing an undesirable increase in voltage of the generator. A reverse variation of speed of course produces a corresponding regulation of the generator-field, as will be readily understood.

What I claim as new, and desire to secure by Letters Patent of the United States, is—

1. The combination of a source of alternating current, means for converting the alternating current into direct current, and automatic means for compensating for variation of voltage of the direct current occasioned by variation of frequency of the alternating current.

2. The combination of a prime mover, an alternating-current generator driven thereby, a motor-generator arranged to receive energy from said alternating-current generator, and automatic means for compensating for variation of voltage of the generator element of said motor-generator occasioned by fluctuations in speed of the prime mover.

3. The combination of a prime mover, an alternating-current generator driven thereby, transmission-lines extending from said generator, a motor-generator set fed with current derived from said transmission-lines, and means for regulating the electromotive force of the generator element of the motor-generator set in accordance with variation of frequency of current in said transmission-lines.

4. The combination of alternating-current and direct-current mains leading respectively from the motor and generator of a motor-generator set, a regulating-generator operatively connected to said generator, and means responsive to the frequency of current in the alternating-current mains for driving said regulating-generator.

5. The combination of alternating-current and direct-current mains leading respectively from the motor and generator of a motor-generator set, a regulating-generator operatively connected to said generator, and means responsive to the frequency of current in the alternating-current mains for controlling the speed of rotation of said regulating-generator.

In witness whereof I have hereunto set my hand this 3d day of December, 1900.

THOMAS WALLEY WILLIAMS.

Witnesses:
 BENJAMIN B. HULL,
 FRED RUSS.